(12) United States Patent
Lee (10) Patent No.: US 11,792,906 B2
(45) Date of Patent: Oct. 17, 2023

(54) X-RAY APPARATUS

(71) Applicant: ELEC-FIELD FUTURE CORP., Suwon-si (KR)

(72) Inventor: Han Sung Lee, Hwaseong-si (KR)

(73) Assignee: ELEC-FIELD FUTURE CORP., Suwon-si (KR)

( * ) Notice: Subject to any disclaimer, the term of this patent is extended or adjusted under 35 U.S.C. 154(b) by 280 days.

(21) Appl. No.: 17/226,413

(22) Filed: Apr. 9, 2021

(65) Prior Publication Data

US 2021/0321507 A1    Oct. 14, 2021

(30) Foreign Application Priority Data

Apr. 10, 2020   (KR) .......................... 10-2020-0043747
Nov. 5, 2020   (KR) .......................... 10-2020-0146848

(51) Int. Cl.
*H05G 1/12*        (2006.01)
*H02M 3/158*       (2006.01)

(52) U.S. Cl.
CPC ............ *H05G 1/12* (2013.01); *H02M 3/1582* (2013.01)

(58) Field of Classification Search
CPC ............ H05G 1/06; H05G 1/12; H05G 1/265; H05G 1/70
See application file for complete search history.

(56) References Cited

U.S. PATENT DOCUMENTS

| 10,971,323 | B1* | 4/2021 | Hansson | .................. H05G 1/70 |
| 11,166,360 | B2* | 11/2021 | Ishii | ..................... H05G 1/025 |
| 2013/0114794 | A1* | 5/2013 | Yamamoto | ............... H05G 1/06 |
| | | | | 378/140 |
| 2014/0177805 | A1* | 6/2014 | Wang | ....................... H05G 1/00 |
| | | | | 378/104 |

(Continued)

FOREIGN PATENT DOCUMENTS

EP    0 691 801 A1    1/1996
JP    2006-73381 A    3/2006

(Continued)

OTHER PUBLICATIONS

English translation of JP-2007149521 (Year: 2007).*

(Continued)

*Primary Examiner* — Dani Fox
*Assistant Examiner* — Soorena Kefayati
(74) *Attorney, Agent, or Firm* — Sughrue Mion, PLLC (57) ABSTRACT

The present disclosure relates to an X-ray apparatus capable of stable driving, miniaturization, and weight reduction. The X-ray apparatus may include a case having an installation space formed therein; a high voltage separator installed inside the case, responsible for dividing the installation space into a first installation portion and a second installation portion, and having a high voltage generation space formed therein; an X-ray tube installed in the first installation portion; a high voltage generator installed in the high voltage generation space and responsible for receiving power from the outside, boosting the power, and supplying (Continued)

the boosted power to the X-ray tube; and a controller installed in the second installation portion and responsible for controlling driving of the X-ray tube and the high voltage separator.

13 Claims, 7 Drawing Sheets

(56) References Cited

U.S. PATENT DOCUMENTS

| | | | | |
|---|---|---|---|---|
| 2014/0283385 A1* | 9/2014 | Watanabe | ............... | H01J 35/16 |
| | | | | 378/68 |
| 2015/0098552 A1* | 4/2015 | Draper | ............... | H05G 1/06 |
| | | | | 378/142 |
| 2015/0348737 A1* | 12/2015 | Nakamura | ............... | H01J 35/18 |
| | | | | 378/101 |
| 2016/0020061 A1* | 1/2016 | Ikarashi | ............... | H01J 35/116 |
| | | | | 378/111 |
| 2016/0073485 A1* | 3/2016 | Kwan | ............... | H05G 1/06 |
| | | | | 378/104 |
| 2019/0252150 A1* | 8/2019 | Yamada | ............... | H01J 35/186 |
| 2019/0318902 A1* | 10/2019 | Ishii | ............... | H01J 35/16 |
| 2020/0068692 A1* | 2/2020 | Ernest | ............... | H05G 1/06 |
| 2020/0137862 A1* | 4/2020 | Kawaguchi | ............... | H05G 1/12 |
| 2021/0029808 A1* | 1/2021 | Ishii | ............... | H05G 1/06 |
| 2021/0100088 A1* | 4/2021 | Ishii | ............... | H05G 1/06 |

FOREIGN PATENT DOCUMENTS

| | | | |
|---|---|---|---|
| JP | 2007-149521 A | | 6/2007 |
| JP | 2007149521 A | * | 6/2007 |
| JP | 2019-186092 A | | 10/2019 |
| KR | 10-1684400 B1 | | 12/2016 |
| KR | 10-1742642 B1 | | 6/2017 |
| KR | 10-1806954 B1 | | 12/2017 |
| WO | 2006/025320 A1 | | 3/2006 |
| WO | 2019/198342 A1 | | 10/2019 |

OTHER PUBLICATIONS

Communication dated Jul. 27, 2022 from the Korean Intellectual Property Office in Application No. 10-2020-0146848.
Extended European Search Report dated Sep. 16, 2021 in European Application No. 21167585.5.

* cited by examiner

X-RAY APPARATUS

CROSS-REFERENCE TO RELATED APPLICATIONS

This application claims priority to Korean Patent Application No. 10-2020-0043747, filed on Apr. 10, 2020, and Korean Patent Application No. 10-2020-0146848, filed on Nov. 5, 2020, in the Korean Intellectual Property Office, the disclosures of each of which are incorporated herein by reference.

BACKGROUND OF THE DISCLOSURE

Field of the Disclosure

The present disclosure relates to an X-ray apparatus, and more particularly, to an X-ray apparatus including a high voltage separator made of an electrically insulating material between an X-ray tube and a high voltage generator. With this configuration, high voltage interference between the X-ray tube and the high voltage generator may be minimized, which enables stable operation and allows the X-ray tube and the high voltage generator to be installed in the same case, thereby enabling miniaturization and weight reduction of a product.

Description of the Related Art

In general, X-rays are widely used in various fields such as industry, science, and medicine for nondestructive inspection, inspection of the structure and the physical properties of a material, image diagnosis, security screening, and the like. In general, an X-ray generating apparatus includes a high voltage generator including a high voltage transformer for generating a high voltage and a high voltage rectifier circuit for transforming a high AC voltage into a high DC voltage and boosting the voltage; and an X-ray generator including an X-ray tube for emitting X-rays by power applied from the high voltage generator.

The conventional X-ray generating apparatus has a structure characterized in that the high voltage generator and the X-ray generator are installed separately from each other and a high voltage cable is installed between the high voltage rectifier circuit of the high voltage generator and the power input terminal of the X-ray tube to apply the power of the high voltage generator to the X-ray tube. In the case of the conventional X-ray generating apparatus having such a separate structure, due to limitation in the capacitance of the high voltage cable, time delay occurs when outputting voltage, which hinders improvement of the quality of X-rays. In addition, since the high voltage generator and the X-ray generator are installed in separate cases, the weight and volume of a product increase.

RELATED ART DOCUMENTS

Patent Documents (Patent Document 1) Korean Patent No. 10-1684400 (publication date: Dec. 8, 2016)

SUMMARY OF THE DISCLOSURE

Therefore, the present disclosure has been made in view of the above problems, and it is an object of the present disclosure to provide an X-ray apparatus having a structure characterized in that the inside of a case is divided into several spaces by a high voltage separator made of an electrically insulating material, and an X-ray tube and a high voltage generator are separately installed in the spaces. With such a structure, high voltage interference between areas where the X-ray tube and the high voltage generator are respectively located may be minimized, and thus the X-ray apparatus may be stably driven.

It is another object of the present disclosure to provide an X-ray apparatus including an X-ray tube and a high voltage generator installed in the same case. When the X-ray apparatus having such a configuration is used, miniaturization and weight reduction of a product may be implemented.

In accordance with one aspect of the present disclosure, provided is an X-ray apparatus including a case having an installation space formed therein; a high voltage separator installed inside the case, responsible for dividing the installation space into a first installation portion and a second installation portion, and having a high voltage generation space formed therein; an X-ray tube installed in the first installation portion; a high voltage generator installed in the high voltage generation space and responsible for receiving power from outside, boosting the power, and supplying the boosted power to the X-ray tube; and a controller installed in the second installation portion and responsible for controlling driving of the X-ray tube and the high voltage separator.

In addition, the high voltage generation space of the high voltage separator may be divided into a first high voltage generation space and a second high voltage generation space by a separation plate, and the high voltage generator may include a DC transformer installed in the first high voltage generation space and responsible for transforming an AC voltage supplied from outside into a DC voltage to output a voltage of 10 kV to 100 kV and a high voltage booster installed in the second high voltage generation space and responsible for boosting a voltage transformed by the DC transformer to a high voltage of 100 kV to 300 kV.

In addition, a first seating groove in which the DC transformer is seated and a second seating groove in which the high voltage booster is seated may be formed in a recessed form on an inner side of the high voltage separator.

In addition, a surface of the high voltage separator may be subjected to insulating molding using an electrically insulating material.

In addition, the high voltage separator may be installed to be detachable from the case.

In addition, an X-ray tube holder for supporting the X-ray tube in a detachable manner may be installed in the first installation portion.

In addition, the X-ray apparatus may further include an X-ray shield configured to surround a side portion of the X-ray tube to shield X-rays generated upon driving of the X-ray tube.

In addition, the X-ray shield may be installed to be detachable from the high voltage separator.

In addition, a cover of the X-ray tube may be formed of a ceramic material.

In addition, the X-ray tube may generate electrons using any one of a filament-based thermal electron emission method and a carbon nanotube (CNT)-based electric field emission method.

In addition, collimator coupling portions may be formed on one side of the case so that a collimator is selectively coupled thereto.

In addition, the X-ray apparatus may include a temperature controller for maintaining a temperature inside the case within a preset range.

In addition, the temperature controller may include a Peltier element.

In addition, at least one installation groove may be formed in a recessed form on an inner bottom surface of the case facing the X-ray tube and the controller so that the temperature controller is installed on the inner bottom surface.

In addition, one or more position adjustment grooves may be formed in a recessed form on an inner bottom surface of the case and a gap adjustment plate may be seated in the position adjustment grooves to control a radiation position of X-rays generated from the X-ray tube.

In addition, one or more suction fans for sucking in external air may be installed on one side of the case, and at least one exhaust fan for discharging internal air outside may be formed on the other side of the case.

In addition, the controller may control driving of the X-ray tube using one of a continuous driving method and a digital pulse driving method.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Hereinafter, an X-ray apparatus according to a preferred embodiment will be described in detail with reference to the accompanying drawings. In this specification, the same or similar elements are designated by the same reference numerals. In the following description of the present disclosure, repeated description will be omitted, and detailed description of known functions and configurations incorporated herein will be omitted when it may make the subject matter of the present disclosure unclear. The embodiments of the present disclosure are provided to more fully describe the present disclosure to those skilled in the art. Accordingly, the shapes and sizes of elements in the drawings may be exaggerated for clearer explanation.

Figure 1:
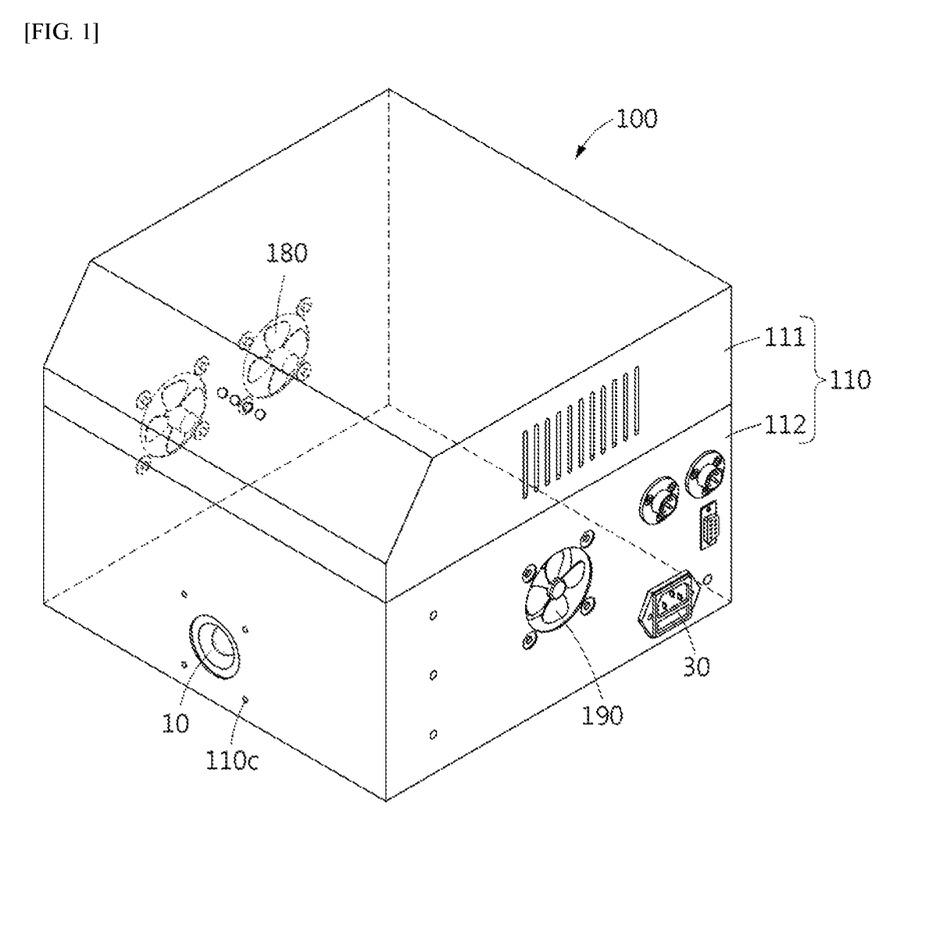
FIG. 1 is a perspective view of an X-ray apparatus according to one embodiment of the present disclosure.
Figure 2:
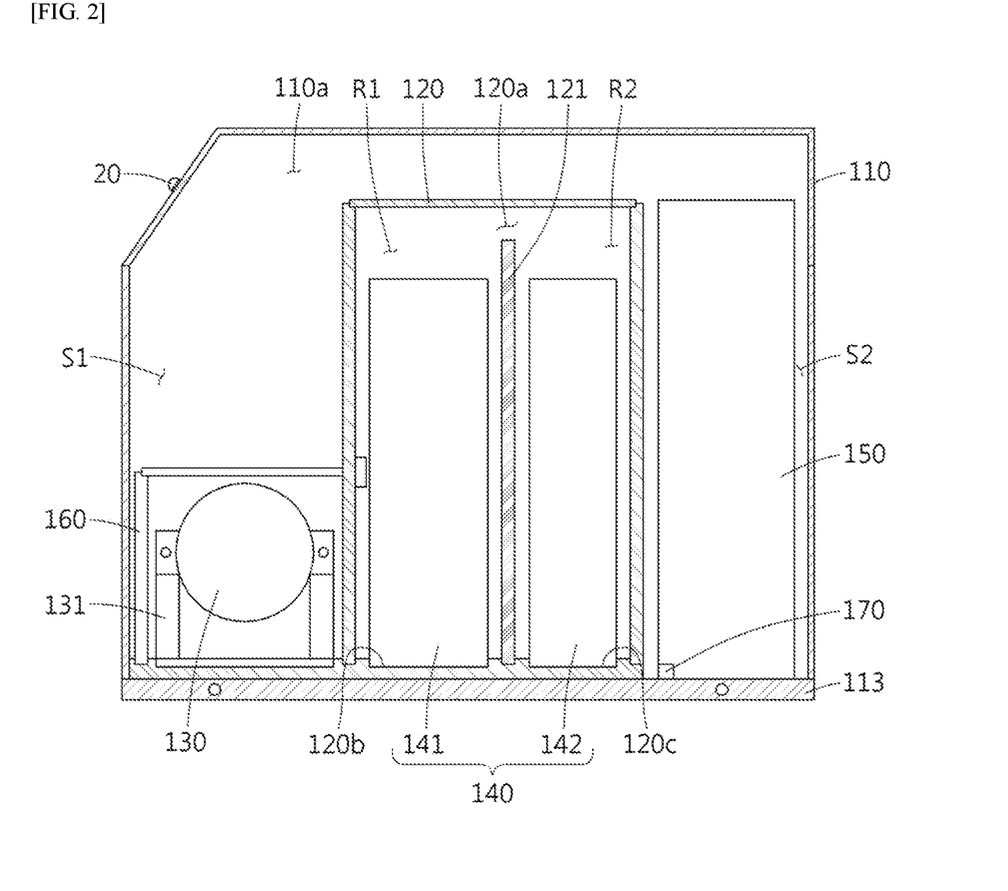
FIG. 2 is a side view showing the inside of the X-ray apparatus illustrated in FIG. 1.
Figure 3:
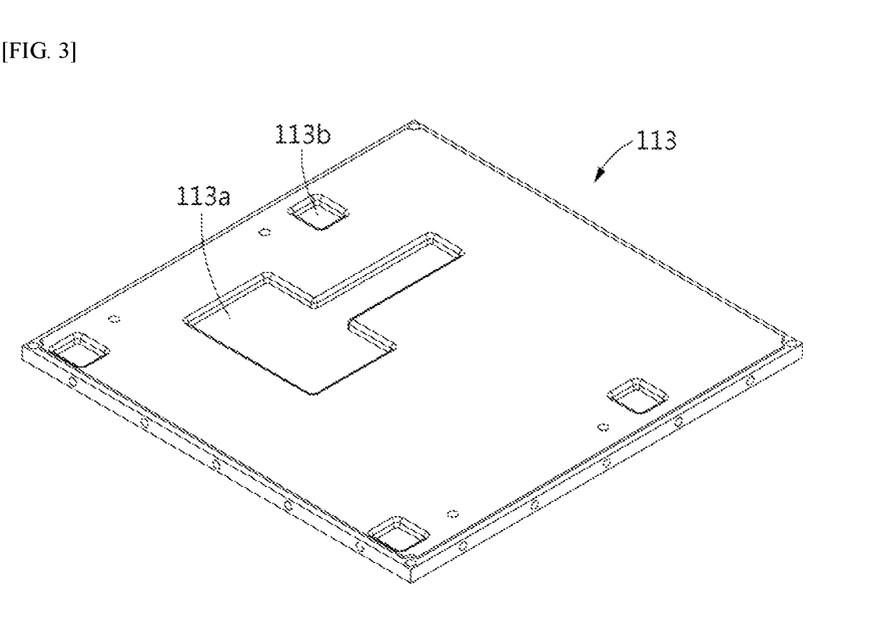
FIG. 3 is a perspective view showing the bottom of the X-ray apparatus illustrated in FIG. 1.
Figure 4:
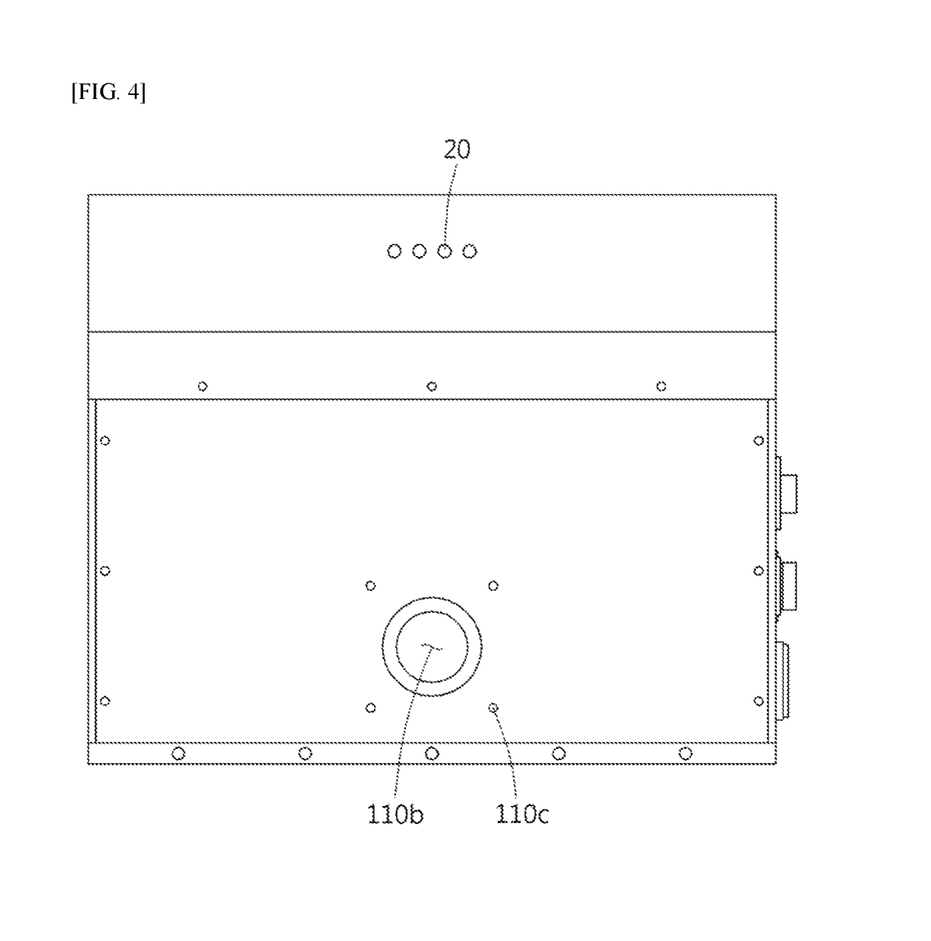
FIG. 4 is a front view of the X-ray apparatus illustrated in FIG. 1.
Figure 5:
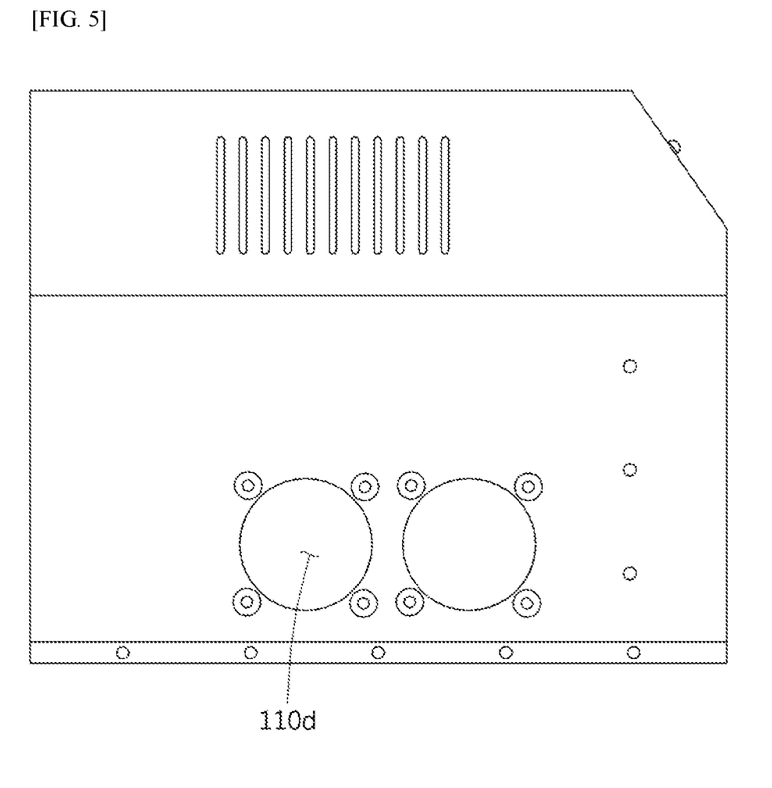
FIG. 5 is a left side view of the X-ray apparatus illustrated in FIG. 1.
Figure 6:
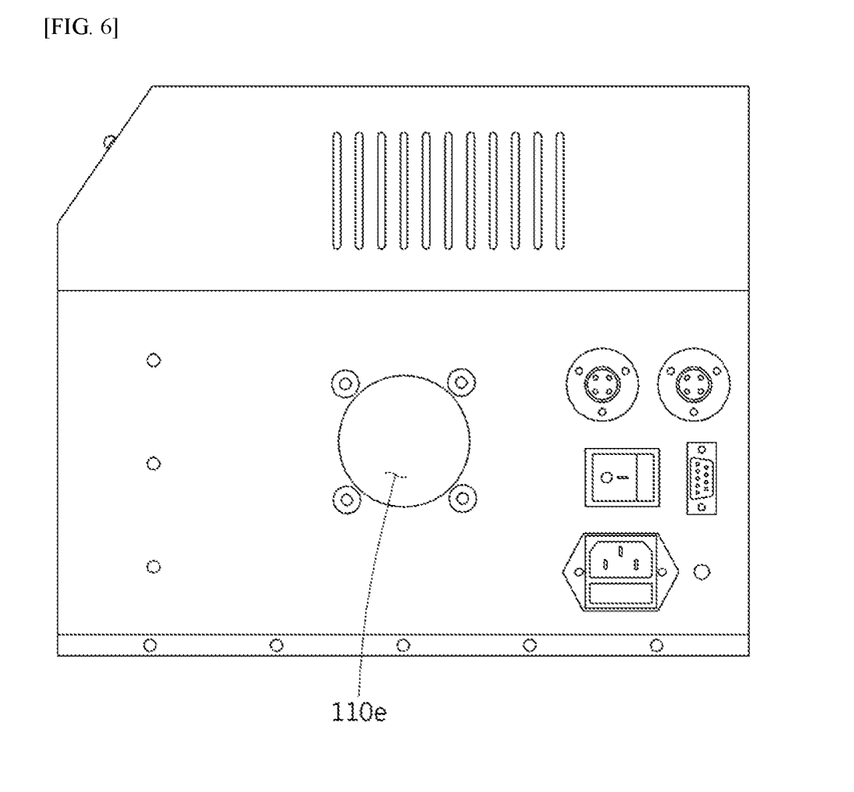
FIG. 6 is a right side view of the X-ray apparatus illustrated in FIG. 1.

FIG. 1 is a perspective view of an X-ray apparatus according to one embodiment of the present disclosure, FIG. 2 is a side view showing the inside of the X-ray apparatus illustrated in FIG. 1, and FIG. 3 is a perspective view showing the bottom of the X-ray apparatus illustrated in FIG. 1. FIG. 4 is a front view of the X-ray apparatus illustrated in FIG. 1, FIG. 5 is a left side view of the X-ray apparatus illustrated in FIG. 1, and FIG. 6 is a right side view of the X-ray apparatus illustrated in FIG. 1.

Referring to FIGS. 1 to 6, an X-ray apparatus 100 may include a case 110, a high voltage separator 120, an X-ray tube 130, a high voltage generator 140, and a controller 150.

The case 110 may have an installation space 110a formed therein. For example, the case 110 may have a hexahedral shape with the installation space 110a formed therein, and may be formed in a structure in which an upper body portion 111 and a lower body portion 112 are detachably coupled to each other to assemble and replace parts installed in the case 110 easily.

A lens hole 110b through which X-rays are emitted may be formed on one side of the case 110. For example, a portion of the front surface of the case 110 may be drilled to form the circular lens hole 110b, and a lens 10 may be inserted into and coupled to the lens hole 110b to adjust the focus of X-rays.

Collimator coupling portions 110c may be formed on one side of the case 110 so that a collimator is selectively coupled thereto. For example, the collimator coupling portions 110c may be formed by drilling around the lens 10 located on the front surface of the case 110 to form a plurality of coupling holes, and the collimator may be bolted to the front surface of the case 110 through the collimator coupling portions 110c. In addition, the case 110 may include various control buttons 20 for setting imaging conditions and controlling power and a power terminal 30.

The high voltage separator 120 may be provided in the case 110 to divide the installation space 110a into a first installation portion S1 and a second installation portion S2. In addition, the upper portion of the high voltage separator 120 may be spaced apart from the case 110 at a predetermined interval. Such a configuration may improve heat dissipation efficiency, and may provide a space for connecting parts inside the case 110 using a cable line or the like.

For example, the high voltage separator 120 may be provided in a box shape with both ends open, and may be disposed in the center of the installation space 110a of the case 110, so that the first installation portion S1 may be formed in the front area of the installation space 110a and the second installation portion S2 may be formed in the rear area of the installation space 110a.

That is, the inside of the case 100 may be partitioned by the high voltage separator 120 so that the front area thereof may be designated as the first installation portion S1 and the rear area thereof may be designated as the second installation portion S2. Here, the front area corresponds to a portion in which the lens 10 of the X-ray apparatus 100 is installed, and the rear area corresponds to a portion opposite to the portion in which the lens 10 is installed.

A high voltage generation space 120a may be formed inside the high voltage separator 120. In addition, the high voltage generation space 120a formed inside the high voltage separator 120 may be divided into a first high voltage generation space R2 and a second high voltage generation space R1 by a separation plate 121. That is, the separation plate 121 serves to divide the high voltage generation space 120a formed inside the high voltage separator 120 into two areas. The separation plate 121 and the high voltage separator 120 may be formed as a single molded product, or may be separately manufactured and then combined with each other.

The high voltage separator 120 and the separation plate 121 may be formed of an electrically insulating material such as ceramic, or the surfaces thereof may be subjected to insulating molding using an electrically insulating material such as silicone or epoxy. In this way, when the high voltage separator 120 and the separation plate 121 are formed of an electrically insulating material or are subjected to insulating molding using an electrically insulating material, electrical interference between the high voltage generator 140 and the X-ray tube 130 to be described later may be prevented.

The high voltage separator 120 may be installed to be detachable from the case 110. For example, the high voltage separator 120 may be coupled to an inner bottom surface 113 of the case 110 by welding, force fitting, bolting, or the like. Accordingly, when components provided inside the high voltage separator 120 are broken or damaged, the high voltage separator 120 may be separated from the case 110, and then the components may be repaired or replaced. Thus, maintenance and replacement may be easy.

The X-ray tube 130 may be installed in the first installation portion S1 to emit electrons. Although not shown, the X-ray tube 130 according to the present embodiment may include a source device for generating electrons. The source device may emit electrons using at least one of a thermal electron emission method in which heat generated by heating a filament inside the cover of the X-ray tube 130 is accelerated using a high voltage and a carbon nanotube (CNT)-based electric field emission method.

For example, a first source device that emits electrons by the carbon nanotube-based electric field emission method or a second source device that emits electrons by the filament-based thermal electron emission method may be selected as the source device, and the selected source device may be included in the X-ray tube 130. Due to such a structure, when necessary, any one of the thermal electron emission method through heating of a filament and the carbon nanotube (CNT)-based electric field emission method may be selected, the selected method may be applied to an electron emission source, and the electron emission source may be used to manufacture the X-ray tube 130.

The cover of the X-ray tube 130 may be formed of a ceramic material having electrical insulating properties. For example, the cover of the X-ray tube 130 made of a ceramic material may be formed in a specific thickness to have shielding performance equivalent to that of lead. Thus, the X-ray tube 130 may be effectively insulated, and damage caused by X-ray exposure may be effectively prevented.

The high voltage generator 140 may be installed in the high voltage generation space 120*a*. The high voltage generator 140 may receive power from the outside, may boost the power, and may supply the power to the X-ray tube 130. In this way, since the high voltage generator 140 is provided in the high voltage generation space 120*a*, interference between the X-ray tube 130 and the high voltage generator 140 may be minimized, thereby enabling stable driving.

Specifically, the high voltage generator 140 may include a DC transformer 142 and a high voltage booster 141.

The DC transformer 142 may be installed in the first high voltage generation space R2, and may transform an AC voltage supplied from the outside into a DC voltage to output a voltage of 10 kV to 100 kV. For example, the DC transformer 142 may be seated in a first seating groove 120*c* formed on the inner side of the high voltage separator 120. That is, the DC transformer 142 may be located at the rear of the separation plate 121, and may be coupled to the first seating groove 120*c* by welding, force fitting, bolting, or the like.

The high voltage booster 141 may be installed in the second high voltage generation space R1, and may boost a voltage transformed by the DC transformer 142 to a high voltage of 100 kV to 300 kV. For example, the high voltage booster 141 may be seated in a second seating groove 120*b* formed on the inner side of the high voltage separator 120. That is, the high voltage booster 141 may be located in front of the separation plate 121, and may be coupled to the second seating groove 120*b* by welding, force fitting, bolting, or the like.

As described above, since the high voltage generator 140 is formed in a configuration including the DC transformer 142 and the high voltage booster 141, power supplied from the outside may be boosted by the DC transformer 142 and the high voltage booster 141 and may be applied to the X-ray tube 130, and then the X-ray tube 130 to which power is applied may generate X-rays. At this time, since the DC transformer 142 and the high voltage booster 141 are separated from each other by the separation plate 121, electrical interference between high voltages generated from the DC transformer 142 and the high voltage booster 141 may be prevented.

The controller 150 may be installed in the second installation portion S2 to control driving of the X-ray tube 130 and the high voltage separator 120. For example, the controller 150 may drive the high voltage separator 120 to supply power to the X-ray tube 130. When power is supplied to the X-ray tube 130, the controller 150 may perform control so that the first and second source devices of the X-ray tube 130 may be driven simultaneously or selectively. In this way, the controller 150 may quickly respond to X-ray imaging methods required under various imaging conditions.

In addition, the controller 150 may further include an inverter for precisely controlling an anode high voltage portion and a gate low voltage portion to drive a triode, an MCU board, an indicator board for monitoring an X-ray radiation state and an interlock; and a converter power device for converting an AC voltage of 110 V or 220 V into a DC voltage.

According to the present disclosure, an X-ray tube holder 131 for supporting the X-ray tube 130 in a detachable manner may be installed in the first installation portion S1 of the case 110. For example, the X-ray tube holder 131 may be tilted, and the height of the X-ray tube holder 131 may be adjusted. Thus, the position of the X-ray tube 130 may be finely adjusted by adjusting the X-ray tube holder 131.

According to the present disclosure, the X-ray apparatus 100 may include an X-ray shield 160 that surrounds the side portion of the X-ray tube 130 to shield X-rays generated upon driving of the X-ray tube 130. For example, the X-ray shield 160 may be formed of a ceramic material and may be installed detachably in front of the high voltage separator 120. In this way, since the X-ray shield 160 made of an insulating material is formed to surround the X-ray tube 130, damage caused by X-ray exposure may be prevented. In addition, electrical interference between the high voltage generator 140 installed on one side and the X-ray tube 130 may be minimized, thereby enabling stable driving.

According to the present disclosure, to reduce the temperature inside the case 110, the X-ray apparatus 100 may include a temperature controller 170, suction fans 180, and an exhaust fan 190.

The temperature controller 170 serves to maintain the temperature inside the case 110 within a preset range, and may include a Peltier element. The Peltier element serves to cool a specific local area using the Peltier effect and is a semiconductor device using electronic cooling. According to the principle of operation of the Peltier element, when both ends of two different metal wires are joined and then direct current is passed through a circuit, endothermic reaction occurs at one junction, and exothermic reaction occurs at the other junction. When the direction of the current is reversed, the junctions where endothermic reaction and exothermic reaction occur are interchanged. When such a Peltier element is installed inside the case 110, the periphery of the case 110 may be accurately maintained at a desired temperature.

The temperature controller 170 may be installed near the X-ray tube 130 and the controller 150. For this configuration, at least one installation groove 113a may be formed in a recessed form on the inner bottom surface 113 of the case 110 facing the X-ray tube 130 and the controller 150 so that the temperature controller 170 may be installed on the inner bottom surface 113.

For example, after the bottom surface 113 is manufactured using a metal material having excellent heat capacity and thermal conductivity, such as aluminum and copper, the installation groove 113a may be formed on one surface of the bottom surface 113. Alternatively, the installation groove 113a formed on the bottom surface 113 made of a ceramic material may be coated with a metal material such as aluminum and copper to improve heat dissipation efficiency. The temperature controller 170 may be seated in the installation groove 113a and coupled to the case 110. In this way, when the installation groove 113b is formed on the bottom surface 113 of the case 110 and the temperature controller 170 is coupled thereto, heat generated from the X-ray tube 130 and the controller 150 may be effectively dissipated.

In addition, one or more position adjustment grooves 113b may be formed in recessed form on the inner bottom surface 113 of the case 110. As in the case of the installation groove 113a, the position adjustment grooves 113b may be formed on the bottom surface 113 made of a metal material such as aluminum and copper. Alternatively, the position adjustment grooves 113b formed on the bottom surface 113 made of a ceramic material may be coated with a metal material such as aluminum and copper to improve heat dissipation efficiency. Accordingly, when a gap adjustment plate (not shown) is seated in the position adjustment grooves 113b, the radiation position of X-rays generated from the X-ray tube 130 may be adjusted.

For example, when the position adjustment grooves 113b are formed at areas where both ends of the X-ray tube 130 are located and at areas where both ends of the controller 150 are located, and then the gap adjustment plate is seated in the position adjustment grooves 113b, the radiation position of X-rays may be finely adjusted depending on the thickness of the gap adjustment plate. In this case, when a gap adjustment plate located in the front and a gap adjustment plate located in the rear are formed to have different thicknesses, the angle of radiation of X-rays emitted from the X-ray tube 130 may be adjusted by the difference in thickness, thereby obtaining a tilting effect.

One or more suction fans 180 may be installed to suck in external air, and at least one exhaust fan 190 may be installed to discharge the air inside the case 110 to the outside. For example, two suction fans 180 may be provided and bolted to one side of the case 110, and one exhaust fan 190 may be provided and bolted to the other side of the case 110. With this configuration, external cold air may be introduced into the case 110 through the suction fans 180, and the hot air and the heat-exchanged air inside the case 110 may be discharged to the outside of the case 110 through the exhaust fan 190.

To install the suction fans 180 and the exhaust fan 190 in the case 110, suction fan installation holes 110d may be formed on one side of the case 110, and an exhaust fan installation hole 110e may be formed on the other side of the case 110.

As described above, in the X-ray apparatus 100, the installation space 110a of the case 110 is divided into several spaces by the high voltage separator 120 made of an electrically insulating material, and thus the X-ray tube 130 and the high voltage generator 140 may be installed in the single case 110, thereby enabling miniaturization and weight reduction of the X-ray apparatus 100.

In addition, since the high voltage separator 120 is installed between the X-ray tube 130 and the high voltage generator 140, high voltage interference between areas where the X-ray tube 130 and the high voltage generator 140 are located may be minimized, thereby enabling stable driving.

In addition, since the cover of the X-ray tube 130 is formed of ceramic, which is an electrically insulating material, an insulation effect may be obtained, and damage caused by X-ray exposure may be prevented.

In addition, since the X-ray tube 130 generates electrons using at least one of a thermal electron emission method through heating of a filament or an electric field emission method using a carbon nanotube (CNT) emitter, X-ray emission efficiency may be improved.

In addition, since the temperature controller 170, the suction fans 180, and the exhaust fan 190 are installed to reduce the temperature inside the case 110, heat generated upon driving of the X-ray tube 130 may be effectively dissipated.

Figure 7:
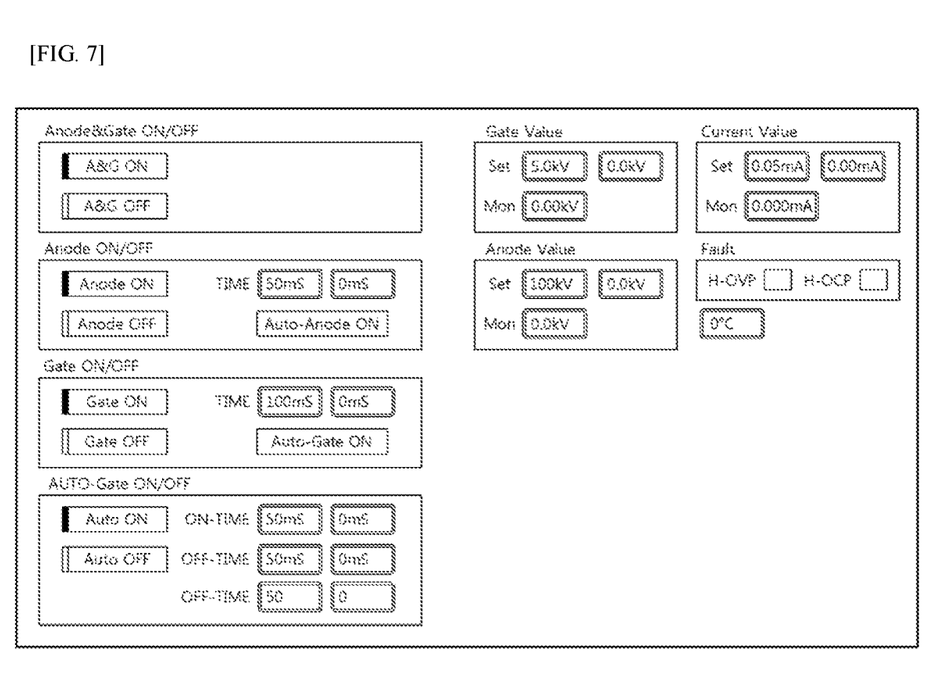
FIG. 7 is a block diagram schematically showing software (S/W) for driving the X-ray apparatus illustrated in FIG. 1.

FIG. 7 is a block diagram schematically showing software (S/W) for driving the X-ray apparatus illustrated in FIG. 1.

Referring to FIG. 7, the controller 150 may control driving of the X-ray tube 130 using one of a continuous driving method and a digital pulse driving method. That is, the controller 150 may control driving of the X-ray tube 130 using one of the continuous driving method, which is the filament-based thermal electron emission method, and the digital pulse driving method, which is the electric field emission method using a carbon nanotube (CNT) emitter.

For example, according to the continuous driving method, the anode and the gate of the X-ray tube 130 may be simultaneously driven ("ON") for continuous driving. At this time, the anode may be continuously driven until input of "Anode OFF", or the driving time of the anode may be set using a separate time and then the anode may be automatically turned off ("OFF") when the driving time has elapsed. Also, the gate may be continuously driven until input of "Gate OFF", or the driving time of the gate may be set using a separate time and then the gate may be automatically turned off ("OFF") when the driving time has elapsed.

According to the digital pulse driving method, when "AUTO ON" is input after "ON-TIME" and "OFF-TIME" of the gate are set, the gate may be driven. The gate may operate until input of "AUTO OFF". At this time, the gate may be turned off ("OFF") automatically after operating as much as a value entered in "COUNT". This function is important for high-speed and continuous acquisition of computed tomography (CT) 3D X-ray images. The use of this function may implement an industrial in-line X-ray CT system.

According to the present disclosure, since the inside of a case is divided into several spaces by a high voltage separator made of an electrically insulating material, an X-ray tube and a high voltage generator can be installed in the same case. Thus, miniaturization and weight reduction of an X-ray apparatus can be implemented.

In addition, since the high voltage separator is provided between the X-ray tube and the high voltage generator, high voltage interference between areas where the X-ray tube and the high voltage generator are respectively located can be minimized, thereby enabling stable driving.

In addition, since the cover of the X-ray tube is formed of ceramic, which is an electrically insulating material, an insulating effect can be effectively ensured, and damage caused by X-ray exposure can be effectively prevented.

In addition, since the X-ray tube is formed to generate electrons using at least one of a thermal electron emission method through heating of a filament and an electric field emission method using a carbon nanotube (CNT) emitter, X-ray emission efficiency can be improved.

In addition, since a temperature controller, suction fans, and an exhaust fan are installed to reduce the temperature inside the case, heat generated when the X-ray tube is driven can be efficiently dissipated.

Embodiments of the present disclosure disclosed in the present specification and drawings are only provided to aid in understanding of the present disclosure and the present disclosure is not limited to the embodiments. It will be apparent to those skilled in the art that various modifications can be made to the above-described exemplary embodiments of the present disclosure without departing from the spirit and scope of the invention. Therefore, the scope of protection of the present disclosure should be defined by the following claims.

DESCRIPTION OF SYMBOLS

110: CASE
110a: INSTALLATION SPACE
120: HIGH VOLTAGE SEPARATOR
120a: HIGH VOLTAGE GENERATION SPACE
121: SEPARATION PLATE
130: X-RAY TUBE
140: HIGH VOLTAGE GENERATOR
141: HIGH VOLTAGE BOOSTER
142: DC TRANSFORMER
150: CONTROLLER
160: X-RAY SHIELD
170: TEMPERATURE CONTROLLER
180: SUCTION FANS
190: EXHAUST FAN

What is claimed is:

1. An X-ray apparatus, comprising:
a case having an installation space formed therein;
a high voltage separator installed inside the case, responsible for dividing the installation space into a first installation portion and a second installation portion, and having a high voltage generation space formed therein;
an X-ray tube installed in the first installation portion;
a high voltage generator installed in the high voltage generation space and responsible for receiving power from outside, boosting the power, and supplying the boosted power to the X-ray tube; and
a controller installed in the second installation portion and responsible for controlling driving of the X-ray tube and the high voltage separator,
wherein the high voltage generation space of the high voltage separator is divided into a first high voltage generation space and a second high voltage generation space by a separation plate, and
wherein the high voltage generator comprises a DC transformer installed in the first high voltage generation space and responsible for transforming an AC voltage supplied from outside into a DC voltage to output a voltage of 10 kV to 100 kV and a high voltage booster installed in the second high voltage generation space and responsible for boosting a voltage transformed by the DC transformer to a high voltage of 100 kV to 300 kV.

2. The X-ray apparatus according to claim 1, wherein a first seating groove in which the DC transformer is seated and a second seating groove in which the high voltage booster is seated are formed in a recessed form on an inner side of the high voltage separator.

3. The X-ray apparatus according to claim 1, wherein a surface of the high voltage separator is subjected to insulating molding using an electrically insulating material.

4. The X-ray apparatus according to claim 1, wherein the high voltage separator is installed to be detachable from the case.

5. The X-ray apparatus according to claim 1, wherein an X-ray tube holder for supporting the X-ray tube in a detachable manner is installed in the first installation portion.

6. The X-ray apparatus according to claim 1, further comprising an X-ray shield configured to surround a side portion of the X-ray tube to shield X-rays generated upon driving of the X-ray tube.

7. The X-ray apparatus according to claim 1, wherein a cover of the X-ray tube is formed of a ceramic material.

8. The X-ray apparatus according to claim 1, wherein the X-ray tube generates electrons using any one of a filament-based thermal electron emission method and a carbon nanotube (CNT)-based electric field emission method.

9. The X-ray apparatus according to claim 1, wherein collimator coupling portions are formed on one side of the case so that a collimator is selectively coupled thereto.

10. The X-ray apparatus according to claim 1, comprising a temperature controller for maintaining a temperature inside the case within a preset range.

11. The X-ray apparatus according to claim 6, wherein the X-ray shield is installed to be detachable from the high voltage separator.

12. The X-ray apparatus according to claim 10, wherein the temperature controller comprises a Peltier element.

13. The X-ray apparatus according to claim 10, wherein at least one installation groove is formed in a recessed form on an inner bottom surface of the case facing the X-ray tube and the controller so that the temperature controller is installed on the inner bottom surface.

* * * * *